(12) United States Patent
Shaw et al.

(10) Patent No.: US 8,719,282 B1
(45) Date of Patent: May 6, 2014

(54) RESTRICTED-LOCALITY SYNONYMS

(75) Inventors: Hayden Shaw, Palo Alto, CA (US);
Robert B. Avery, Emeryville, CA (US);
Trystan G. Upstill, Palo Alto, CA (US);
Thomas Strohmann, Fremont, CA (US); Pi-Chuan Chang, Fremont, CA (US); John Blitzer, Mountain View, CA (US)

(73) Assignee: Google Inc., Mountain View, CA (US)

( * ) Notice: Subject to any disclaimer, the term of this patent is extended or adjusted under 35 U.S.C. 154(b) by 15 days.

(21) Appl. No.: 13/403,849

(22) Filed: Feb. 23, 2012

Related U.S. Application Data

(63) Continuation of application No. 13/372,342, filed on Feb. 13, 2012.

(60) Provisional application No. 61/533,142, filed on Sep. 9, 2011.

(51) Int. Cl.
*G06F 17/30* (2006.01)
(52) U.S. Cl.
USPC ............................ 707/749; 707/613; 707/640

(58) Field of Classification Search
None
See application file for complete search history.

(56) References Cited

U.S. PATENT DOCUMENTS

| | | | |
|---|---|---|---|
| 8,037,086 B1 * | 10/2011 | Upstill et al. | 707/767 |
| 8,041,730 B1 * | 10/2011 | Upstill et al. | 707/769 |
| 2004/0122656 A1 * | 6/2004 | Abir | 704/4 |

* cited by examiner

*Primary Examiner* — Anteneh Girma
(74) *Attorney, Agent, or Firm* — Fish & Richardson P.C.

(57) ABSTRACT

Methods, systems, and apparatus, including computer programs encoded on a computer storage medium, for identifying and scoring restricted-locality synonyms. In one aspect, a method includes receiving a search query including a query term and a synonym for the query term. The synonym is evaluated using one or more predetermined criteria and based on the evaluation is designated as a restricted-locality synonym. A first scoring model is selected that specifies how to score occurrences of restricted-locality synonyms in documents. A document is received that is identified as being responsive to the search query. A document score for the document is determined using the first scoring model.

27 Claims, 7 Drawing Sheets

RESTRICTED-LOCALITY SYNONYMS

CROSS-REFERENCE TO RELATED APPLICATIONS

This application is a continuation application of, and claims priority to, U.S. patent application Ser. No. 13/372,342, filed on Feb. 13, 2012, entitled "Restricted Locality Synonyms," which claims priority to U.S. Provisional Patent Application No. 61/533,142, filed on Sep. 9, 2011, entitled "Restricted Locality Synonyms," the entirety of which is hereby incorporated by reference.

BACKGROUND

This specification generally relates to search engines, and one particular implementation relates to scoring documents that are identified as being responsive to search queries.

SUMMARY

Search systems use query revision engines to revise search queries, for example to include synonyms of query terms. To identify a synonym of a query term, query revisers evaluate candidate synonyms according to various criteria, such as criteria that estimate whether, in a particular context, a candidate synonym is a good synonym of the query term. "Goodness" of a particular candidate synonym may be expressed, for example, by the amount of confidence, trust, consistency, reliability, or other characteristic that defines an association between a query term and the candidate synonym.

Once search results are obtained using revised search queries that include synonyms, however, a scoring engine may still score search results based on an assumption that occurrences of all synonyms of a query term are equivalent to, or "equally as good as," occurrences of the query term. Such action may ignore the nuanced differences in confidence, trust, consistency, or reliability that a particular synonym of the query term has in relation to a different synonym.

Thus, according to one aspect of the subject matter described in this specification, synonyms that satisfy certain criteria (e.g., reliability criteria), may be tagged or otherwise designated as restricted-locality synonyms, indicating that the restricted-locality synonyms' occurrence in relation to other query terms or other synonyms in identified documents may affect the search result score. The search result score can be affected by restricting counts of particular synonyms to occurrences that are near occurrences of other search query terms in a document. In other words for scoring, a restricted-locality synonym is restricted to occurrences with other words in the search query; other occurrences are not counted or are discounted. When search results are scored, search results that were identified based on a revised search query that included a restricted-locality synonym may be scored using a framework that (i) is different than an framework that is used to score query terms or highly reliable synonyms, and (ii) is informed by the fact that, with respect to a particular query term and a particular context, one synonym may be more or less reliable than another synonym.

In general, another aspect of the subject matter described in this specification may be embodied in methods that include the actions of classifying a synonym of a query term as a restricted-locality synonym. A scoring engine that scores occurrences of synonyms in documents can use a different scoring model for synonyms identified as restricted-locality synonyms when computing document scores for ranking search results.

In general, another aspect of the subject matter described in this specification may be embodied in methods that include the actions of receiving a search query including a query term and a synonym for the query term; evaluating the synonym and the query term using one or more predetermined criteria; and based on evaluating the synonym and the query term using the one or more predetermined criteria, designating the synonym as a restricted-locality synonym, wherein a synonym designated as a restricted-locality synonym is evaluated by a scoring engine according to a first scoring model that specifies how to score occurrences of restricted-locality synonyms in documents, and wherein the first scoring model is different than a second scoring model that specifies how to score occurrences of query terms or synonyms that are not designated as a restricted-locality synonym in documents. Other embodiments of these aspects include corresponding systems, apparatus, and computer programs, configured to perform the actions of the methods, encoded on computer storage devices.

These and other embodiments can each optionally include one or more of the following features. The first scoring model specifies that a contribution, to a document score, of occurrences of the restricted-locality synonym in the document depends on whether one or more other terms co-occur with the restricted-locality synonym in the document. Evaluating the synonym and the query term using one or more predetermined criteria includes determining whether the synonym and the query term are morphological variants. Evaluating the synonym and the query term using one or more predetermined criteria includes determining whether the synonym and the query term are abbreviation or acronym variants. Evaluating the synonym and the query term using one or more predetermined criteria includes identifying a synonym rule used to generate the synonym and a confidence value associated with the synonym rule; and determining whether a confidence value associated with the synonym rule satisfies a threshold. Evaluating the synonym and the query term using one or more predetermined criteria includes determining whether the synonym was identified using a specific-context synonym rule. Evaluating the synonym and the query term using one or more predetermined criteria includes determining whether the query term or the synonym is a proper name. Evaluating the synonym and the query term using one or more predetermined criteria includes determining whether the query term or the synonym is a particular part of speech. Evaluating the synonym and the query term using one or more predetermined criteria includes determining that each of two or more predetermined criteria has been satisfied.

In general, another innovative aspect of the subject matter described in this specification may be embodied in methods that include the actions of receiving a document identified as being responsive to a search query; receiving an indication that a synonym of a query term in the search query is designated as a restricted-locality synonym; in response to receiving the indication that the synonym is designated as a restricted-locality synonym, selecting a first scoring model that specifies how to score occurrences of restricted-locality synonyms in documents, wherein the first scoring model is different than a second scoring model that specifies how to score occurrences of query terms or synonyms that are not designated as a restricted-locality synonym in documents; and determining a document score for the document using the first scoring model. Other embodiments of these aspects include corresponding systems, apparatus, and computer programs, configured to perform the actions of the methods, encoded on computer storage devices.

These and other embodiments can each optionally include one or more of the following features. The first scoring model specifies that a contribution, to a document score, of occurrences of the restricted-locality synonym in the document depends on whether one or more other terms co-occur with the restricted-locality synonym in the document. The first scoring model demotes a score associated with occurrences of the restricted-locality synonym in the document. The first scoring model defines a demotion of the document score. The first scoring model uses one or more criteria for scoring occurrences of restricted-locality synonyms in the document. Determining a score for the document using the first scoring model includes determining that the document does not include the query term; and based on determining that the document does not include the query term, demoting a score associated with each occurrence of the restricted-locality synonym in the document. Determining a score for the document using the first scoring model includes determining that the document does not include other synonyms of the query term; and based determining that the document does not include the query term, demoting a score associated with each occurrence of the restricted-locality synonym in the document. Determining a score for the document using the first scoring model includes determining that the restricted-locality synonym does not occur adjacent to a query term; and based on determining that the restricted-locality synonym does not occur adjacent to a query term, demoting a score associated with each occurrence of the restricted-locality synonym in the document. Determining a score for the document using the first scoring model includes determining that at least a threshold number of query terms co-occur with the restricted-locality synonym in a sequence of consecutive terms in the document; determining that a length of the sequence satisfies a threshold; and based on determining that the length of the sequence satisfies a threshold, demoting a score associated with each occurrence of the restricted-locality synonym in the document.

Particular embodiments of the subject matter described in this specification can be implemented so as to realize one or more of the following advantages. Using a different scoring model for restricted-locality synonyms can improve the quality and relevance of provided search results. Identifying restricted-locality synonyms can also mitigate the identification of highly-irrelevant search results.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
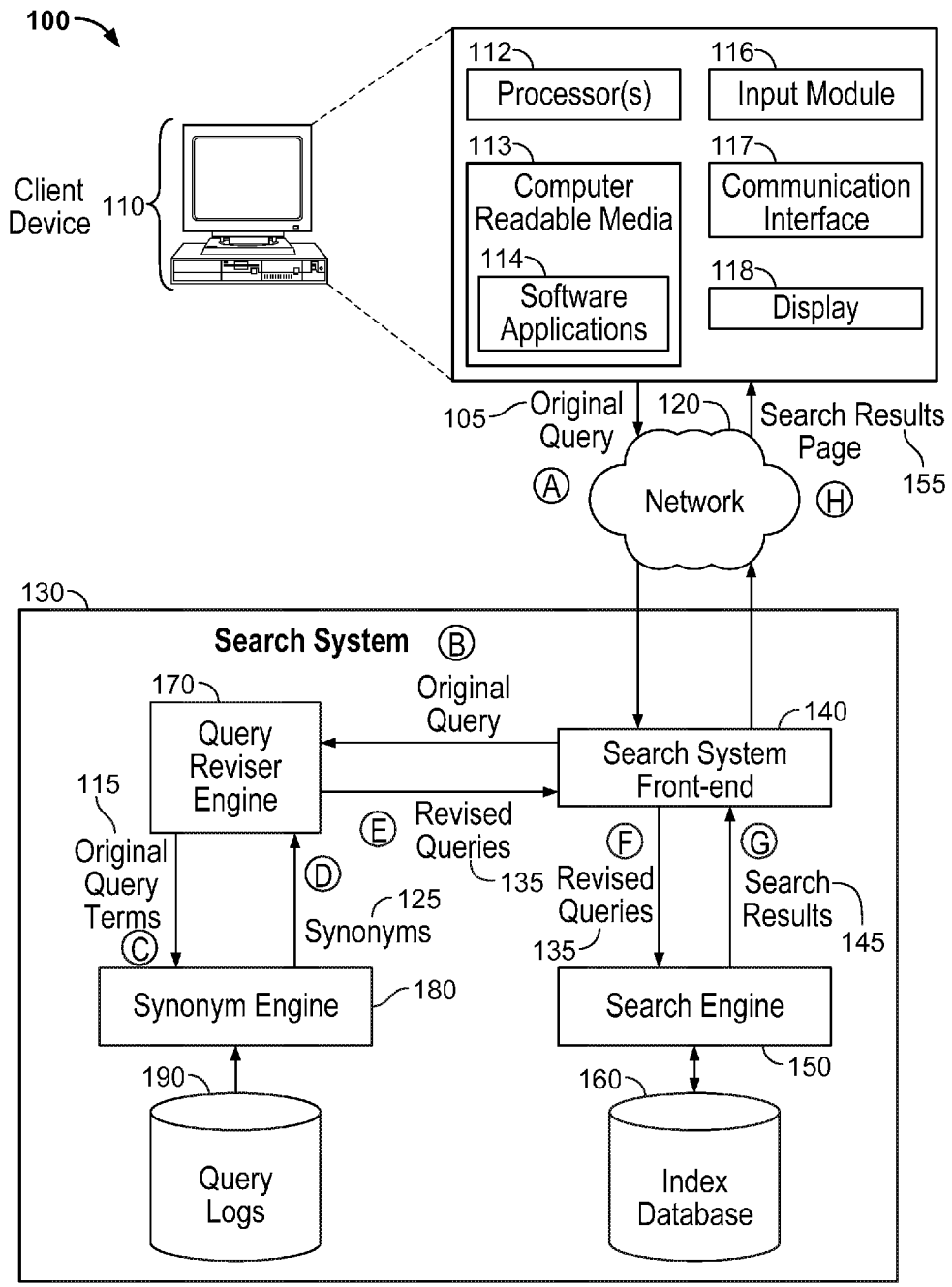
FIG. 1 is a diagram of an example system that uses synonyms to generate search results.

FIG. 1 is a diagram of an example system 100 that can execute implementations of the present disclosure. For example, the system 100 can use synonyms to generate search results. In general, the system 100 includes a client device 110 coupled to a search system 130 over a network 120. The search system 130 includes a search engine 150, a query reviser engine 170, and a synonym engine 180. The search system 130 receives a query 105, referred to by this specification as the "original query" or an "initial query," from the client device 110 over the network 120. The search system 130 provides a search results page 155, which presents search results 145 identified as being responsive to the query 105, to the client device 110 over the network 120.

In some implementations, the search results 145 identified by the search system 130 can include one or more search results that are identified as being responsive to queries that are different than the original query 105. The search system 130 can generate or obtain other queries in numerous ways (e.g., by revising the original query 105).

In some implementations, the search system 130 can generate a revised query by adding to the original query 105 additional terms that are synonyms of one or more terms that occur in the original query 105. In other implementations, the search system 130 can generate a revised query by substituting terms that are synonyms of terms that occur in the original query 105, in place of the terms in the original query 105. As used by this specification, synonyms, i.e., terms that are used to generate revised queries, are also referred to as "substitute terms." The synonym engine 180 can identify the additional terms that are candidate synonyms for the one or more terms that occur in the original query. The query reviser engine 170 can generate the revised query. The search engine 150 can use the original query 105 and the revised queries to identify and rank search results. The search engine 150 can provide the identified search results 145 to the client device 110 on the search results page 155.

The synonym engine 180 can identify the synonyms the query reviser engine 170 can use to generate revised queries by evaluating terms included in previously received queries stored in a query logs database 190. The queries stored in the query logs database 190 can include previous queries where a user considered the results of the queries desirable. For example, the user can click the provided search results from a query, in effect, validating the search results. The queries stored in the query logs database 190 can include previous queries determined by the search system 130 as providing desirable results. For example, the search system 130 can perform a quality thresholding for returned search results from a query. The quality thresholding can include determining search results that have historically been returned for a particular query. Search results above the quality threshold can validate a query, which the search system 130 can then include in the query logs database 190.

For example, given a first term ("cat"), the synonym engine 180 can evaluate terms ("feline" or "banana") that are candidate synonyms for the original term. In addition, the synonym engine 180 can determine that certain terms are synonyms of the first term (as in the case of "feline"), and that other terms are not synonyms of the first term (as in the case of "banana").

The synonym engine 180 can base this determination on rules stored in a synonym rules database 185. For example, a synonym rule can be "feline" is a synonym for cat and "banana" is not a synonym for cat.

The search system 130 can define synonym rules to apply generally, or to apply only when particular conditions, or query contexts, are satisfied. For example, the query context of a synonym rule can specify one or more other terms that should be present in the query for the synonym rule to apply. Furthermore, query contexts can specify relative locations for the other terms (e.g., to the right or left of a query term under evaluation). In another example, query contexts can specify a general location (e.g., anywhere in the query). For example, a particular synonym rule can specify that the term "pet" is a synonym for the query term "dog," but only when the query term "dog" is followed by the term "food" in the query. Multiple distinct synonym rules can generate the same synonym for a given query term. For example, for the query term "dog" in the query "dog food," the term "pet" can be specified as a synonym for "dog" by both a synonym rule for "dog" in the general context and a synonym rule for "dog" when followed by "food."

The synonym rules can depend on query contexts that define other terms in the original query 105. In other words, a synonym rule need not apply in all situations. For example, when the term "cats" is used as a single-term query, the term "felines" can be considered a synonym for "cats". The synonym engine 180 can return the term "felines" to the query reviser engine 170 to generate a revised search query. In another example, when the query includes the term "cats" followed by the term "musical," a synonym rule can specify that the term "felines" is not a synonym for "cats." In some implementations, the synonym rules can be stored in the synonym rules database 185 for use by the synonym engine 180, the query reviser engine 170, or the search engine 150.

In the illustrative example of FIG. 1, the search system 130 can be implemented as computer programs installed on one or more computers in one or more locations that are coupled to each other through a network (e.g., network 120). The search system 130 includes a search system front end 140 (e.g., a "gateway server") that coordinates requests between other parts of the search system 130 and the client device 110. The search system 130 also includes one or more "engines": the search engine 150, a query reviser engine 170, and the synonym engine 180.

As used in this specification, an "engine" (or "software engine") refers to a software implemented input/output system that provides an output that is different from the input. An engine can be an encoded block of functionality, such as a library, a platform, a Software Development Kit ("SDK"), or an object. The network 120 can include, for example, a wireless cellular network, a wireless local area network (WLAN) or Wi-Fi network, a Third Generation (3G) or Fourth Generation (4G) mobile telecommunications network, a wired Ethernet network, a private network such as an intranet, a public network such as the Internet, or any appropriate combination thereof.

The search system front-end 140, the search engine 150, the query reviser engine 170, and the synonym engine 180 can be implemented on any appropriate type of computing device (e.g., servers, mobile phones, tablet computers, notebook computers, music players, e-book readers, laptop or desktop computers, PDAs, smart phones, or other stationary or portable devices) that includes one or more processors and computer readable media. Among other components, the client device 110 includes one or more processors 112, computer readable media 113 that store software applications 114 (e.g., a browser or layout engine), an input module 116 (e.g., a keyboard or mouse), a communication interface 117, and a display device 118. The computing device or devices that implement the search system front-end 140, the query reviser engine 170, and the search engine 150 may include similar or different components.

In general, the search system front-end 140 receives the original query 105 from the client device 110. The search system front-end 140 routes the original query 105 to the appropriate engines included in the search system 130 so that the search system 130 can generate the search results page 155. In some implementations, routing occurs by referencing static routing tables. In other implementations, routing occurs based on the current network load of an engine, in order to accomplish load balancing. In addition, the search system front-end 140 can provide the resulting search results page 155 to the client device 110. In doing so, the search system front-end 140 acts as a gateway, or interface, between the client device 110 and the search engine 150.

Two or more of a search system front-end, a query reviser engine and a search engine (e.g., the search system front-end 140, the query reviser engine 170, and the search engine 150, respectively) may be implemented on the same computing device, or on different computing devices. Because the search system 130 generates the search results page 155 based on the collective activity of the search system front-end 140, the query reviser engine 170, and the search engine 150, the user of the client device 110 may refer to these engines collectively as a "search engine." This specification, however, refers to the search engine 150, and not the collection of engines, as the "search engine," since the search engine 150 identifies the search results 145 in response to the user-submitted query 105.

In some implementations, the search system 130 can include many computing devices for implementing the functionality of the search system 130. The search system 130 can process the received queries and generate the search results by executing software on the computing devices in order to perform the functions of the search system 130.

Referring to FIG. 1, during state (A), a user of the client device 110 enters original query terms 115 for the original query 105, and the client device 110 communicates the original query 105 to the search system 130 over the network 120. For example, the user can submit the original query 105 by initiating a search dialogue on the client device 110, speaking or typing the original query terms 115 of the original query 105, and then pressing a search initiation button or control on the client device 110. The client device 110 formulates the original query 105 (e.g., by specifying search parameters). The client device 110 transmits the original query 105 over the network 120 to the search system 130.

Although this specification refers to the query 105 as an "original" or an "initial" query, such reference is merely intended to distinguish this query from other queries, such as the revised queries that are described below. The designation of the original query 105 as "original" is not intended to require the original query 105 to be the first query that is entered by the user, or to be a query that is manually entered. For example, the original query 105 can be the second or subsequent query entered by the user. In another example, the original query 105 can be automatically derived (e.g., by the query reviser engine 170). In another example, the original query 105 can be modified based on prior queries entered by the user, location information, and the like.

During state (B), the search system front-end 140 receives the original query 105 and communicates the original query 105 to the query reviser engine 170. The query reviser engine 170 can generate one or more revised queries 135 based on the substance of the original query 105. In some implementations, the query reviser engine 170 generates a revised query by adding terms to the original query 105 using synonyms 125 for terms in the original query 105. In other implementations, the query reviser engine 170 generates a revised query by substituting the synonyms 125 for the corresponding terms of the original query 105. The query reviser engine 170 can obtain synonyms 125 for use in revising the original query 105 from the synonym engine 180.

During state (C), the query reviser engine 170 communicates original query terms 115 of the original query 105 to the synonym engine 180. The synonym engine 180 can use synonym rules included in the synonym rules database 185 to determine one or more synonyms 125 for one or more of the original query terms 115 of the original query 105.

The synonym engine 180 communicates synonyms 125 to the query reviser engine 170 during state (D). The query reviser engine 170 generates one or more revised queries 135 by adding synonyms 125 to the original query 105. In addition, the query reviser engine 170 can generate one or more revised queries 135 by substituting certain terms of the original query 105.

The query reviser engine 170 communicates the one or more revised queries 135 to the search system front-end 140 during state (E). The search system front-end 140 communicates the original query 105 along with the one or more revised queries 135 to the search engine 150 as all queries 137 during state (F). The search engine 150 generates search results 145 that it identifies as being responsive to the original query 105 and/or the one or more revised queries 135. The search engine 150 can identify search results 145 for each query using an index database 160 that stores indexed resources (e.g., web pages, images, or news articles on the Internet). The search engine 150 can compute scores for each of the identified search results 145 using a scoring engine that computes a score for an indexed resource using terms of the original query 105 and synonyms 125 of terms in the original query 105. The search engine 150 can combine and rank the identified search results 145 by score and communicate the search results 145 to the search system front-end 140 during state (G).

The search system front-end 140 generates a search results page 155 that identifies the search results 145. For example, each of the search results 145 can include, but are not limited to, titles, text snippets, images, links, reviews, or other information. The original query terms 115 or the synonyms 125 that appear in the search results 145 can be formatted in a particular way (e.g., in bold print and/or italicized print). For example, the search system front-end 140 transmits a document that includes markup language (e.g., HyperText Markup Language or eXtensible Markup Language) for the search results page 155 to the client device 110 over the network 120 at state (H). The client device 110 reads the document (e.g., using a web browser) in order to display the search results page 155 on display device 118. The client device 110 can display the original query terms 115 of the original query 105 in a query box (or "search box"), located, for example, on the top of the search results page 155. In addition, the client device 110 can display the search results 145 in a search results box, for example, located on the left-hand side of the search results page 155.

Figure 2:
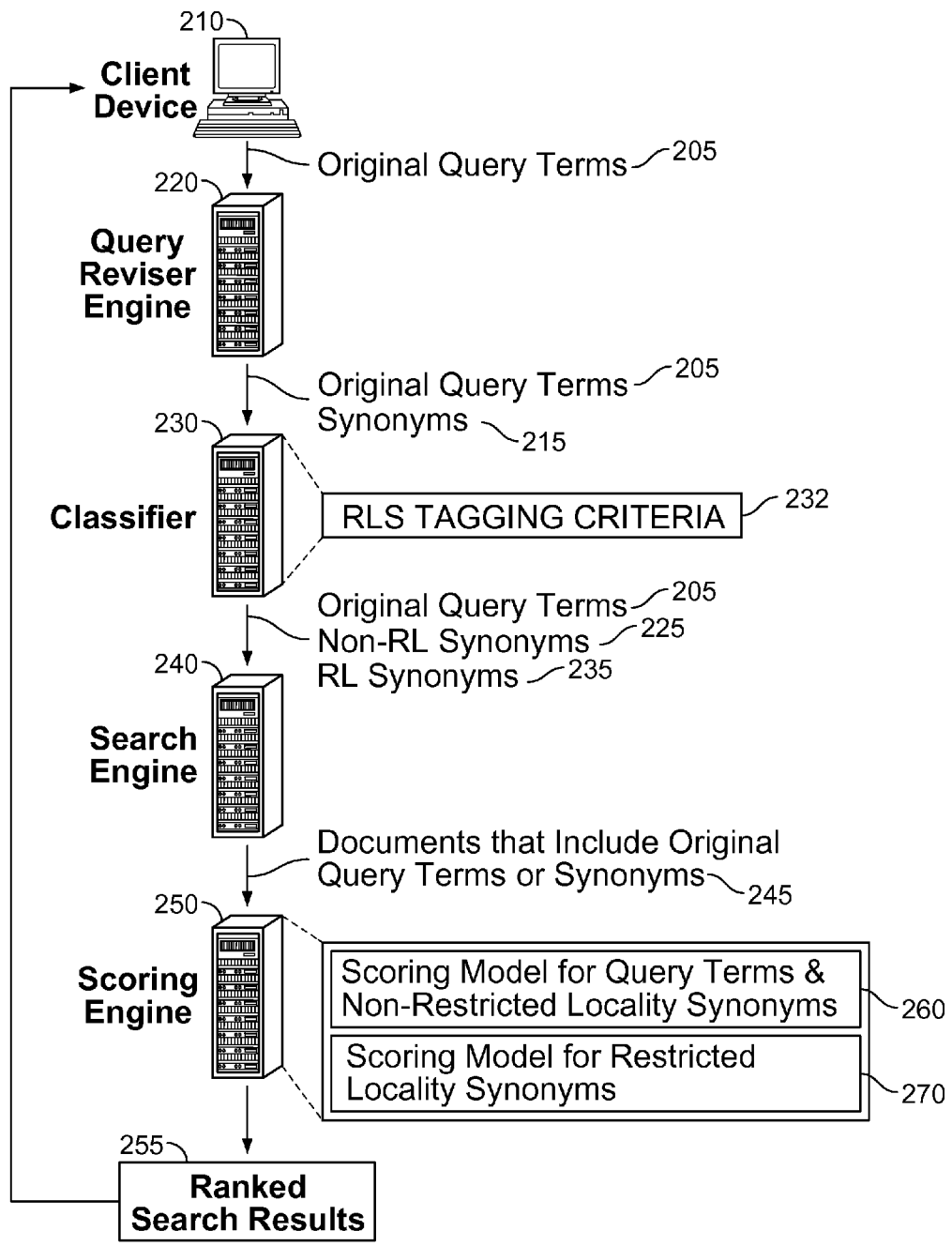
FIG. 2 is a diagram of an example system that uses a scoring model for restricted-locality synonyms to score documents.

FIG. 2 is a diagram of an example system 200 that uses a scoring model for restricted-locality synonyms to score documents. The system 200 includes a client device 210, a query reviser engine 220, a classifier 230, a search engine 240, and a scoring engine 250. The entities illustrated in FIG. 2 can, for example, be implemented as part of the system illustrated in FIG. 1.

In general, a query including one or more original query terms 205 is received from a client device, and the query reviser engine 220 can identify one or more synonyms 215 of the original query terms 205.

As used by this specification, the synonym rule notation "A→B" indicates that, according to a particular synonym rule, the term "B" is considered to be a synonym for the term "A." Using this rule, the query reviser engine 220 may generate revised queries by adding term "B" to an original query, by substituting term "B" for term "A" in the original query, or by performing other query revision techniques.

The synonyms 215 can be differentiated into different classes or types of synonyms by a classifier 230. In some examples, the classifier 230 can classify synonyms 215 as either restricted-locality synonyms 225 or non-restricted-locality synonyms 235 based on one or more restricted-locality synonym criteria 232. A contribution to a document score of occurrences of a restricted-locality synonym in the document can depend on whether one or more other terms co-occur with the restricted-locality synonym in the document.

The search engine 240 can identify search results 245 using the synonyms 215 of the original query terms 205. To identify search results 245, the search engine 240 may, in some example implementations, retrieve indexed documents that include the original query terms 205, synonyms 215 of the original query terms 205, or both.

The scoring engine 250 then uses one or more scoring models to assign a score to each document identified by search results 245. The scoring engine 250 can use one scoring model 260 for query terms and/or for certain types of synonyms and another second scoring model 270 for all synonyms of the original query terms 205, or for other certain types of the synonyms 215.

A scoring model can, for example, count a number of occurrences of the original query terms 205 and synonyms 215 of the original query terms 205 in a particular document under evaluation. A scoring model specifies how to score occurrences of the original query terms 205 and the synonyms 215 of the original query terms 205 in documents. An example scoring model sums all occurrences of the original query terms 205 and synonyms 215 in a document, and assigns a score to the document or to a search result that references the document, based on the sum.

The scoring engine 250 can also use different scoring models for different types of synonyms. Synonyms that are classified as restricted-locality synonyms can be tagged as restricted-locality synonyms for use by the scoring engine 250. The scoring engine 250 can then use a first scoring model 260 for scoring occurrences of query terms 205 and non-restricted-locality synonyms 235 in documents and can use a second scoring model 270 for scoring occurrences of restricted-locality synonyms in documents.

In some implementations, the second scoring model 270 for restricted-locality synonyms specifies additional criteria for counting or scoring occurrences of restricted-locality synonyms in documents. For example, if a particular synonym is classified as a restricted-locality synonym, the scoring model 270 can specify that the occurrence of that particular synonym in a document will be counted only if that particular synonym is adjacent to a query term in the document. Once the documents are scored, the search results that reference the documents are ranked, and the ranked search results 255 are sent to the client device 210.

Figure 3:
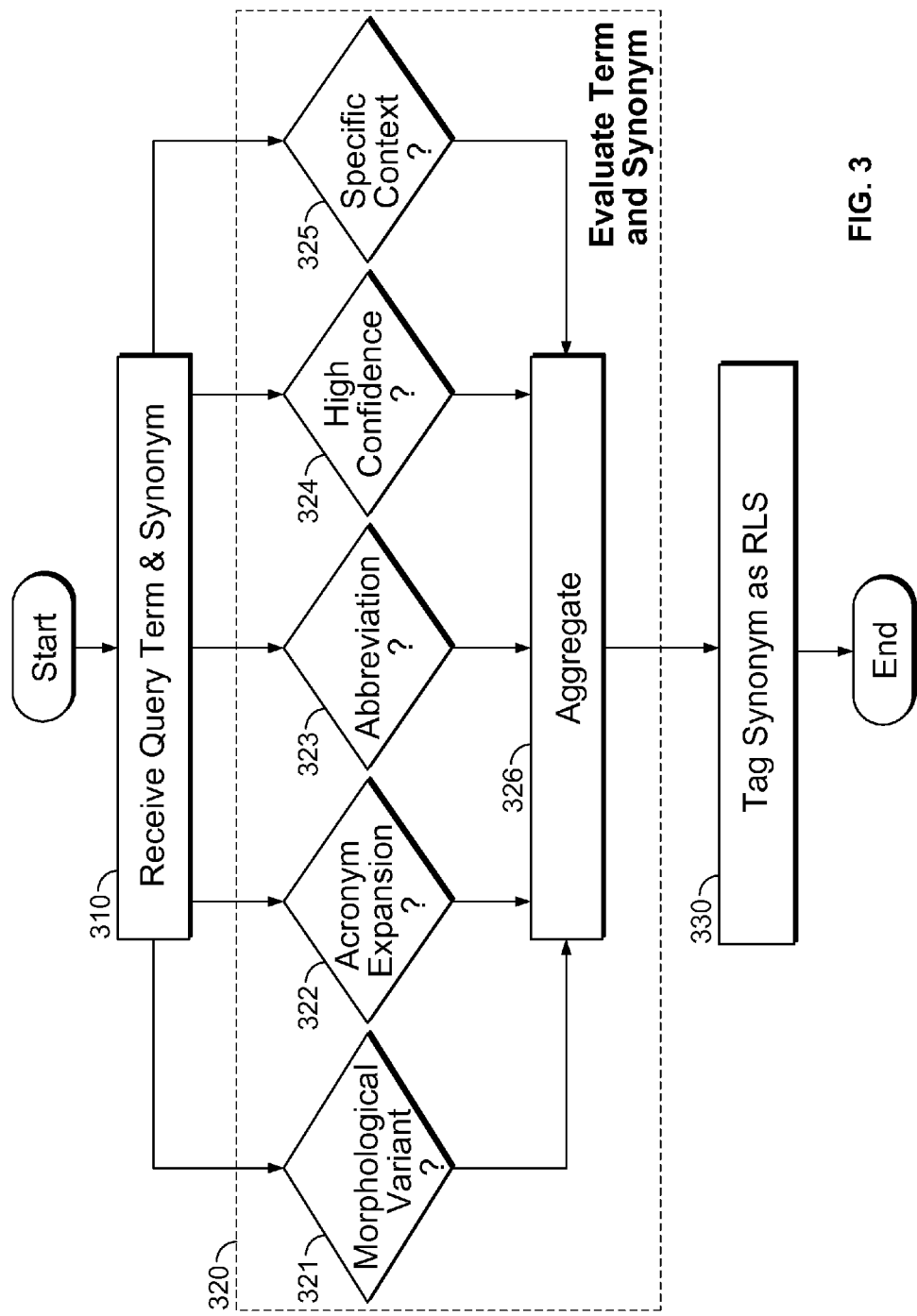
FIG. 3 is a flow chart of an example process for classifying a synonym as a restricted-locality synonym.

FIG. 3 is a flow chart of an example process 300 for classifying synonyms as restricted-locality synonyms or as non-restricted-locality synonyms. In general, the process 300 uses multiple criteria to determine whether a synonym for a query term should be classified as a restricted-locality synonym. The process will be described as a being performed by a computer system comprising one or more computers, for example, the search system shown in FIG. 1.

The system receives a query term and a synonym of the query term (310).

The system evaluates the query term and the synonym (320). The system can use one or more criteria, e.g., criteria 321-325, as signals in order to classify the synonym as a restricted-locality synonym. In general, classifying a synonym as a restricted-locality synonym indicates that the synonym's occurrence in a document should be evaluated for consistency with the original query term's occurrence in the query. Accordingly, the occurrence of a restricted-locality synonym in a document in relation to other query terms or other synonyms of query terms in the document will be taken into account during scoring.

In contrast, non-restricted-locality synonyms may be reliable such that their occurrence in a document in relation to query terms or other synonyms is less significant or disregarded during scoring.

Some of the criteria used in classifying a synonym as a restricted-locality synonym depend on the particular type of synonym being evaluated. A synonym engine that generates synonym rules can tag or otherwise designate a synonym rule as being of a particular type (e.g. an abbreviation or a morphological variant). When a query reviser engine generates a revised query by identifying synonyms for query terms, the identified synonyms can be tagged or designated according to the corresponding designation of the synonym rule used to generate the synonym.

The system can determine whether the query term and the synonym are morphological variants (321). The synonym can, for example, be tagged as a morphological variant synonym by a query reviser engine. Morphological variants include synonyms that are variants of the query term in tense (e.g. "run"→"ran"), number (plural or singular, e.g. "cup"→"cups"), past participle constructions (e.g. "theme"→"themed"), present participle constructions (e.g. "run"→"running"), adverbial constructions (e.g. "poor"→"poorly"), or according to other grammatical rules.

Morphological variants can also include terms that share a same stem, terms in which one term is a spelling correction of the other, or terms that that have an edit distance that satisfies a threshold. The occurrence in documents of synonyms that are morphological variants of query terms tend to be consistent with occurrences of the original query terms in queries regardless of the occurrence of other query terms or other synonyms. Therefore, a synonym being a morphological variant is a negative signal for classifying the synonym as a restricted-locality synonym. In some implementations, if a synonym is a morphological variant of a query term, the synonym is not classified as a restricted-locality synonym.

The system can also determine whether the query term is an acronym for the synonym and vice versa (322). The synonym can, for example, be tagged as an acronym synonym by a query reviser engine. For example, a synonym "FAQ" for the query term "frequently asked questions" can be tagged as an acronym synonym. Because acronyms of terms can have essentially the same meaning regardless of the occurrence of other query terms or other synonyms, occurrences of acronyms in documents tend to be consistent with occurrences of corresponding query terms in queries. Therefore, a synonym or query term being an acronym of the other is a negative signal for classifying the synonym as a restricted-locality synonym. In some implementations, if the query term is an acronym of the synonym (or vice versa), the synonym is not classified as a restricted-locality synonym.

The system can also determine whether the query term is an abbreviation for the synonym and vice versa (323). The synonym can, for example, be tagged as an abbreviation synonym by a query reviser engine. For example, if the query term is "dept" and the synonym is "department," the system can determine that the query term is an abbreviation for the synonym. Because abbreviations of terms can have essentially the same meaning regardless of the occurrence of other query terms or other synonyms, occurrences of abbreviations in documents tend to be consistent with occurrences of corresponding query terms in queries. Therefore, a synonym or query term being an abbreviation of the other is a negative signal for classifying the synonym as a restricted-locality synonym. In some implementations, if the query term is an abbreviation for the synonym (or vice versa), the synonym is not classified as a restricted-locality synonym.

The system can determine whether the synonym rule that generated the synonym has a high confidence value (324). Each synonym rule associated with the query term and synonym can have an associated confidence value. If the confidence value for a particular synonym rule satisfies a threshold, the system can determine that the synonym rule has a high confidence. Synonym rules without a high confidence value can indicate that in some situations or contexts, a synonym may have a different meaning than a particular query term. Therefore, a synonym not having a high confidence value is a positive signal for classifying the synonym as a restricted-locality synonym, so that the synonym's occurrence in documents in relation to other query terms or other synonyms is taken into account during scoring.

In contrast, a synonym with a high confidence value can indicate that the synonym is a reliable substitution for the query term regardless of other query terms or other synonyms. In some implementations, if the synonym was generated with a synonym rule having a high confidence value, the synonym is not classified as a restricted-locality synonym.

The system can determine whether the synonym was generated using a general context synonym rule or a specific context synonym rule (325). The synonym rule "car→auto (:dealer)" is a specific context synonym rule which specifies that "auto" is a synonym for "car" only when "car" is followed by "dealer" in the query. A specific context synonym rule indicates that the synonym is a synonym for the query term only if particular other terms appear in the query along with the query term. Therefore, the occurrence of a synonym in a specific context in a document that is consistent with the context of the original query term in can be considered more significant during scoring.

Accordingly, a synonym being generated by a specific context synonym rule is a positive signal for classifying the synonym as a restricted-locality synonym. In some implementations, if the synonym was generated using a general context synonym rule (and not with a specific context synonym rule), the synonym is not classified as a restricted-locality synonym.

The system can also use signals other than those shown in FIG. 3 in classifying a synonym as a restricted-locality synonym. For example, the system can determine that the synonym is a proper name and that the query term is not a proper name (e.g. "tim"→"time") and use proper names as a positive signal for the synonym being a restricted-locality synonym. The system can also classify the query term and synonym by parts of speech and designate some parts of speech (e.g. verbs) as a positive signal for the synonym being a restricted-locality synonym. Other signals can optionally be used.

The system aggregates the signals to determine whether the synonym should be classified as a restricted-locality synonym (326). For example, the system can apply a weight to each signal and compare a weighted sum of the signals to a threshold. If the sum satisfies the threshold, the system can classify the synonym as a restricted-locality synonym. In some implementations, if any of the criteria are satisfied (e.g. the query term is an abbreviation), the synonym is classified as a non-restricted-locality synonym.

The system tags the synonym as a restricted-locality synonym (330). Tagging the synonym as a restricted-locality indicates to a scoring engine that the occurrences of the synonym in documents should be scored according to a scoring model applicable to restricted-locality synonyms. The system can use any appropriate annotation to designate the synonym as a restricted-locality synonym for use by a scoring engine.

Figure 4:
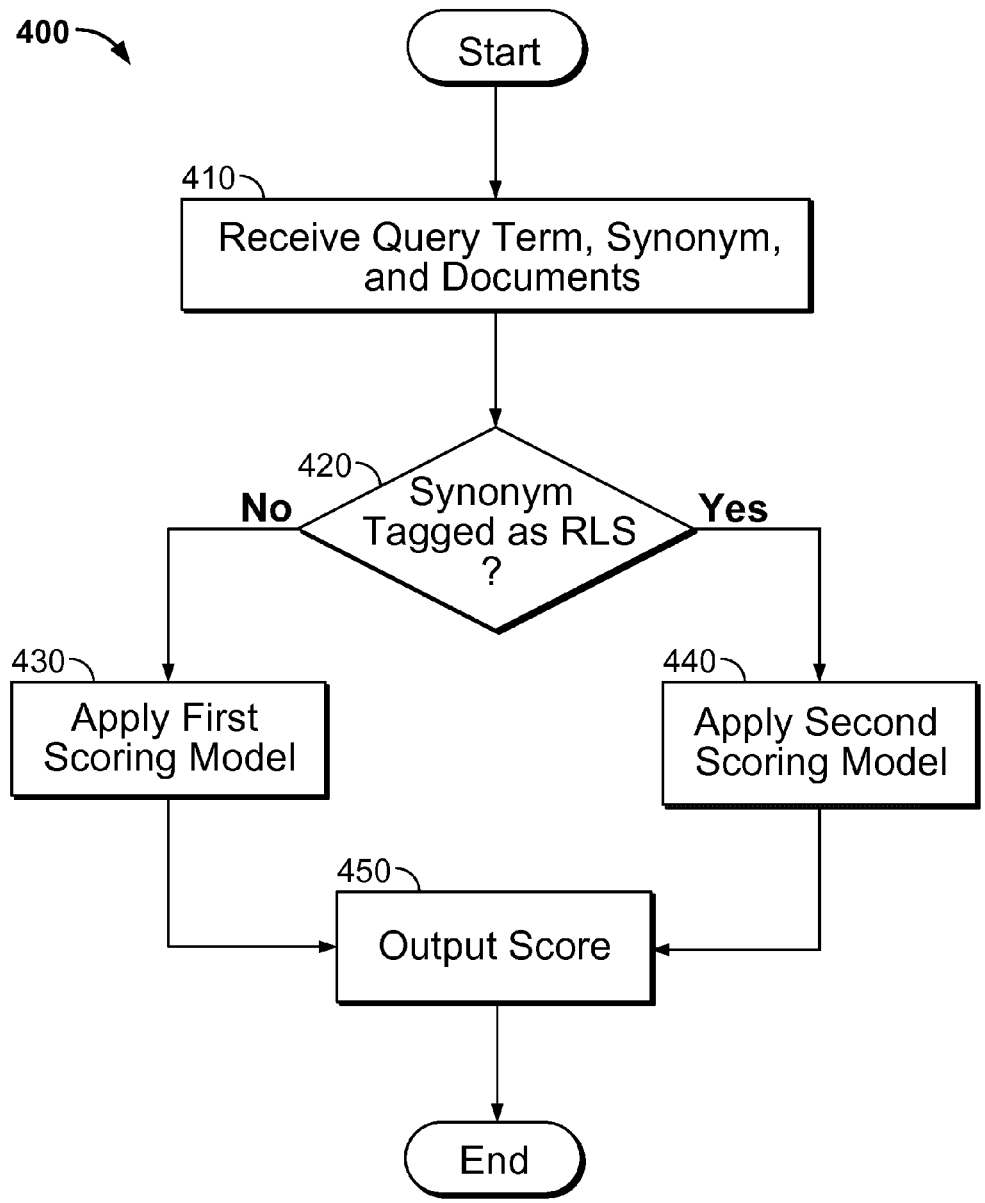
FIG. 4 is a flow chart of an example process for scoring a document with a synonym.

FIG. 4 is a flow chart of an example process 400 for scoring a document identified using a search query revised to include a synonym of a query term in the search query. The process 400 will be described as being performed by a scoring engine, for example, the scoring engine of FIG. 2. In general, the scoring engine determines a score for each of one or more documents according to an appropriate scoring model for the synonym, including counting occurrences of the synonym in each document.

The scoring engine receives a synonym of a query term and one or more documents (410). The scoring engine determines whether the synonym is tagged as a restricted-locality synonym (420).

If the synonym is not tagged as a restricted-locality synonym, the scoring engine applies a first scoring model (430). In some implementations, the first scoring model is the same scoring model used for original query terms. The scoring model can for example, count the occurrences of the synonym in the document.

If the synonym is tagged as a restricted-locality synonym, the scoring engine applies a second scoring model (440). The second scoring model can apply additional criteria on counting occurrences of the synonym in the document, as described in more detail below. The second scoring model can take into account the occurrences of restricted-locality synonyms in relation to other query terms or other synonyms in order to increase the score for documents in which occurrences of restricted-locality synonyms are consistent with occurrences of the original query term in the query.

In some implementations, the scoring engine uses the second scoring model only after determining that the document contains no occurrences of query terms or non-restricted-locality synonyms. In other words, the scoring engine can first count occurrences in the document of query terms and non-restricted-locality synonyms. If no occurrences have been found, the scoring engine can count occurrences of restricted-locality synonyms and score the document according to the second scoring model.

The scoring engine outputs the score for the document (450). The score can be based on a score particular to the received synonym. The scoring engine can combine the synonym score with scores for original query terms and other restricted-locality and non-restricted-locality synonyms to compute an overall score for the document.

Figure 5:
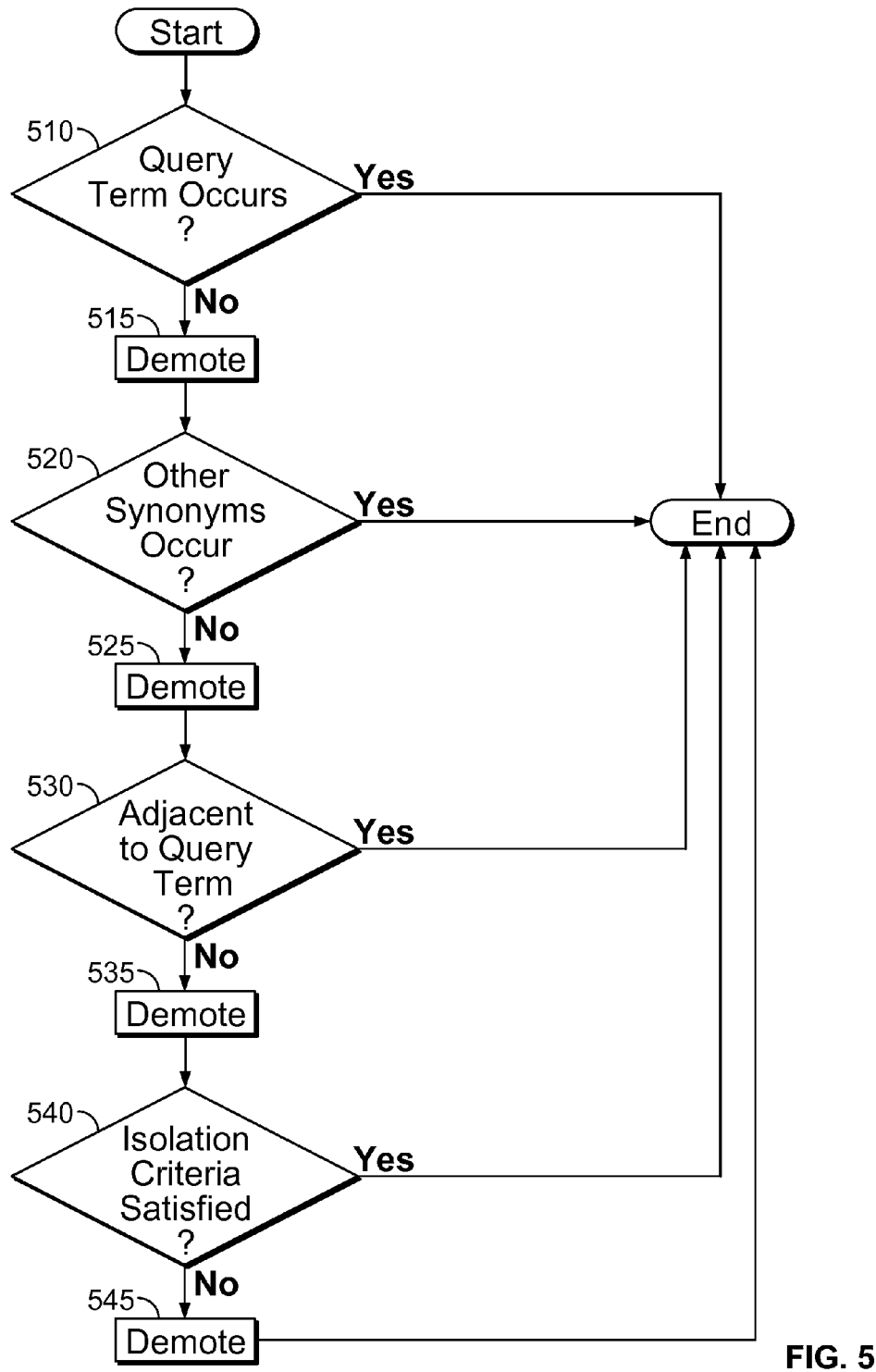
FIG. 5 is a flow chart of an example process for using an example restricted-locality synonym scoring model.

FIG. 5 is a flow chart of an example process 500 for using an example restricted-locality synonym scoring model. The process 500 will be described as being performed by a scoring engine, for example, the scoring engine 250 in FIG. 2. The process 500 can be applied when a document includes at least one occurrence of a synonym that is tagged as a restricted-locality synonym.

In general, one or more additional criteria (e.g. criteria 510, 520, 530, and 540) are evaluated for scoring occurrences of the restricted-locality synonym in the document. For example, if the document does not include the original query term, the document may have been identified by the search engine only by virtue of the occurrence of the restricted-locality synonym in the document. If the synonym is not a reliable synonym or its occurrence in the document is not consistent with the occurrence of the query term in the original query, scoring with a conventional scoring model may over-value occurrences of such unreliable or inconsistent synonyms.

Therefore, the scoring engine can impose the additional criteria on scoring occurrences of restricted-locality synonyms. For each unsatisfied criterion, the scoring engine can adjust the score for the document accordingly. For example, the scoring engine can reduce a contribution to an overall document score of each occurrence of a restricted-locality synonym in a document after each unsatisfied criterion. The scoring engine can also demote a score for each unsatisfied criterion, for example, a score associated with occurrences of a particular restricted-locality synonym or a computed document score. In some implementations, demotion by the scoring engine means that the scoring engine discounts or disregards the occurrence of the restricted-locality synonym in the document when computing a score for the document.

The process 500 will be described as a cascading series of criteria and associated demotions in document score, although the criteria can be applied in any order. The associated demotions in document score can be demotions of a precomputed, temporary, or in-progress document score. As described above, the demotions can alternatively be reductions to a contribution to the document score of occurrences of restricted-locality synonyms. Criteria other than those shown in FIG. 5 can also optionally be used.

The scoring engine determines whether the query term also occurs in the document (510). If the original query term does not occur in the document, the score can be adjusted (e.g. demoted) due to the possibility that the document was retrieved by the search engine only due to the occurrence of the restricted-locality synonym in the document. Thus, the identification of the synonym as a restricted-locality synonym will affect the document score accordingly, and the scoring engine will demote the document score (515). In contrast, if the document also includes the query term, the process ends.

The scoring engine determines whether other synonyms of the query term also occur in the document (520). For example, if the document does not include the query term, but includes another synonym of the query term, the criterion 520 is satisfied. The occurrence of other synonyms of the query term can be an indicator that the occurrence of restricted-locality synonym in the document is consistent with the occurrence of the original query term in the query. Thus, if the document includes another synonym of the query term, the process ends. If the document does not include any other synonym of the query term, the scoring engine demotes the document score (525).

The scoring engine determines whether the restricted-locality synonym is adjacent in the document to a query term (530). For each occurrence of the restricted-locality synonym in the document, the scoring engine can determine whether the term occurring before or after the restricted-locality synonym was in the query. For example, if the restricted-locality synonym is adjacent to another query term in the document, the criterion 530 is satisfied. If the restricted-locality synonym occurs adjacent to another query term in the document, the process ends. If the restricted-locality synonym does not occur adjacent to another query term in the document, the scoring engine demotes the document score (535).

The scoring engine determines whether an isolation criterion for the restricted-locality synonym is satisfied (540). The isolation criterion is used by the scoring engine to evaluate where the restricted-locality synonym occurs in relation to other query terms. In some implementations, the scoring engine finds the shortest sequence of document terms that includes both the restricted-locality synonym and a threshold number of query terms. The scoring engine can use a maximum size (e.g. 10) for the sequence length and a minimum number (e.g. 3) for occurrences of the query terms.

For example, for each occurrence of the restricted-locality synonym in the document, the scoring engine can determine whether the restricted-locality synonym occurs in a sequence of document terms that is less than or equal to the maximum sequence of document terms that also includes greater than or equal to the minimum number of query terms. For example, the scoring engine can specify that a restricted-locality synonym must occur within 5 document terms of at least 2 other query terms for the criterion 540 to be satisfied.

If the restricted-locality synonym does occur in the specified sequence of document terms with the specified number of query terms, the process ends. If, however, the restricted-locality synonym does not occur in the specified sequence document terms with the specified number of query terms, the scoring engine demotes the document score (545). The scoring engine can use multiple of such isolation criteria in serial or in parallel when computing the document score.

The criteria of FIG. 5 can be applied in any appropriate order in serial or any number of the criteria can be applied in parallel. The respective adjustments in score can also be implemented as promotions or score boosts and can be aggregated by the scoring engine in computing the document score.

Figure 6A:
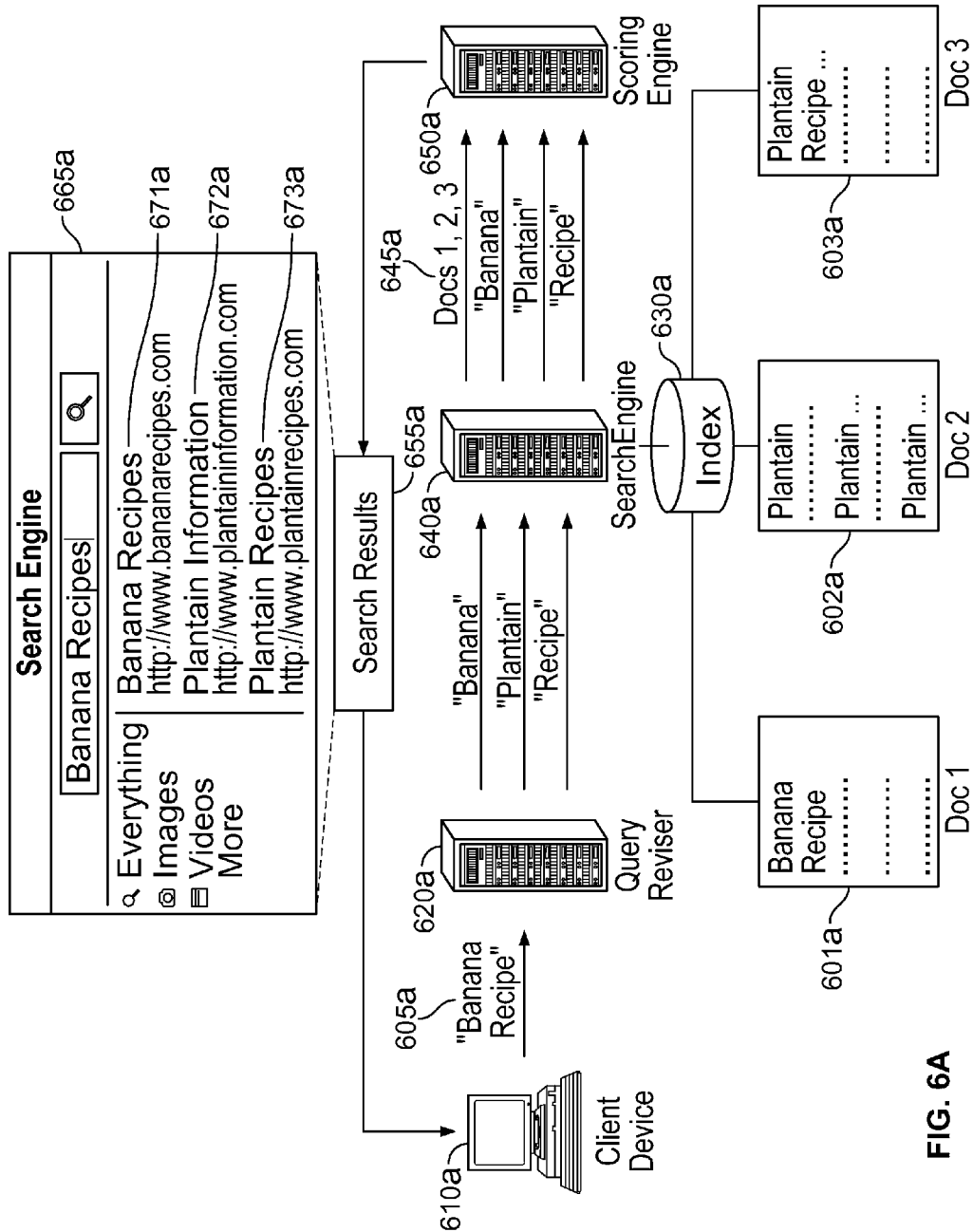
FIG. 6A illustrates scoring of search results using an example scoring model that does not account for restricted-locality synonyms.

FIG. 6A illustrates scoring of search results using an example scoring model that does not account for restricted-locality synonyms. A query 605a is received from a client device 610a. A query reviser engine 620a generates a synonym "plantain" for the query term "banana."

A search engine 640a identifies three example documents 601a, 602a, and 603a using the query terms "banana" and "recipe" as well as the synonym "plantain". A scoring engine 650a scores the documents 601a, 602a, and 603a according to a scoring model that does not account for restricted-locality synonyms. Search results 655a ranked by score are provided back to the client device as, for example, a search results page 665a.

Document 601a corresponds to the highest-ranked search result 671a because the document 601a included an occurrence of the exact query "banana recipe." A search result 672a corresponding to document 602a is ranked higher than search result 673a corresponding to document 603a because document 602a contained more occurrences of query terms and synonyms than document 603a. In other words, document 602a contained three occurrences of the synonym "plantain", while document 603a contained only a single instance of "plantain" and a single instance of the query term "recipe."

Figure 6B:
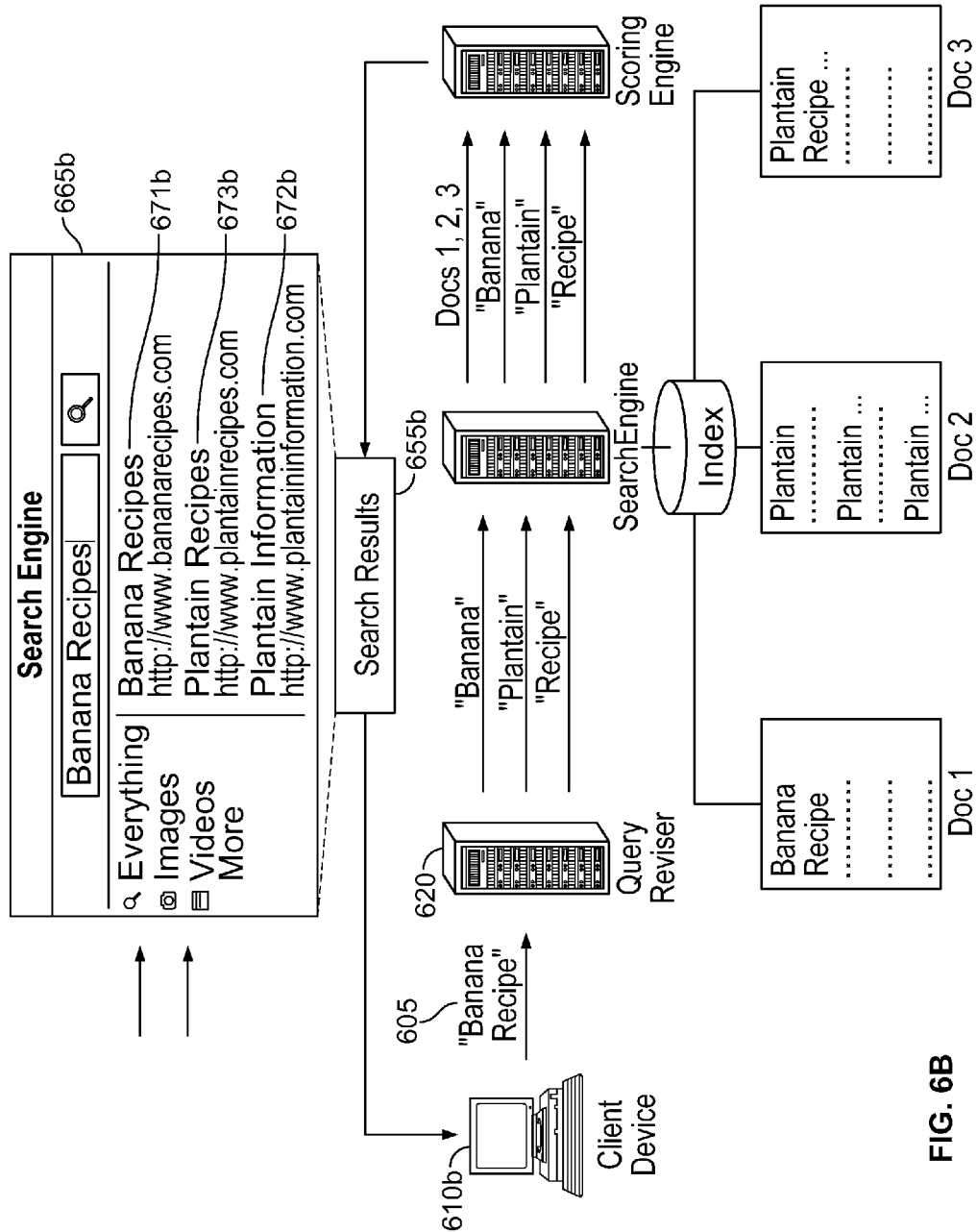
FIG. 6B illustrates scoring of search results using an example scoring model that takes into account restricted-locality synonyms.

FIG. 6B illustrates scoring of search results using an example scoring model that takes restricted-locality synonyms into account. The search engine 640b identifies documents 601b, 602b, and 603b in response to query terms "banana" and "recipe" and synonym "plantain." However, in FIG. 6B, the synonym "plantain" is tagged as a restricted-locality synonym. The scoring engine 650b accordingly uses a different scoring model for the restricted-locality synonym "plantain."

Using the scoring model for restricted-locality synonyms, the scoring engine can demote the score of documents 601b, 602b, and 603b if occurrences of the restricted-locality synonym in the document do not meet certain restricted-locality synonym criteria. For example, occurrences of restricted-locality synonym "plantain" in document 602b do not appear with the original query term "banana," do not appear with any other synonyms of the query term "banana," do not appear adjacent to any original query terms, and do not appear within a maximum sequence with a minimum number of query terms. The scoring engine 650b can demote the computed score for document 602b accordingly.

Document 603b, on the other hand, includes an occurrence of the restricted-locality synonym "plantain" that does occur adjacent to another query term "recipe," an indication that the restricted-locality synonym's occurrence in document 603b is more consistent with the occurrence of the original query term in the query than the occurrence of the restricted-locality synonym in document 602b. Therefore, the scoring engine 650b can demote the score of document 603b less than it demotes the score for document 602b. As a result, the list of ranked search results 655b will be altered and a search result 673b corresponding to document 603b is ranked higher than a search result 672b corresponding to document 602b on search results page 665b.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving a search query including a query term;
   receiving a document identified as being responsive to the search query;
   obtaining a synonym that a synonym rule identifies as a substitute for the query term in the search query;
   receiving an indication that the synonym of the query term in the search query is designated as a restricted-locality synonym;
   in response to receiving the indication that the synonym is designated as a restricted-locality synonym, selecting a first scoring model that specifies how to score occurrences of restricted-locality synonyms in documents, wherein the first scoring model is different than a second scoring model that specifies how to score occurrences of query terms or synonyms that are not designated as a restricted-locality synonym in documents, wherein the first scoring model specifies that a document score for the document depends on whether occurrences of the restricted-locality synonym in the document co-occur in the document with one or more query terms or one or more synonyms of the query term; and
   determining a document score for the document using the first scoring model.

2. The method of claim 1, wherein the first scoring model demotes the document score if an occurrence, of the restricted-locality synonym in the document, is not consistent with an occurrence of the query term in the search query.

3. The method of claim 1, wherein the first scoring model demotes a score associated with occurrences of the restricted-locality synonym in the document.

4. The method of claim 1, wherein the first scoring model defines a demotion of the document score.

5. The method of claim 1, wherein the first scoring model uses one or more criteria for scoring occurrences of restricted-locality synonyms in the document.

6. The method of claim 1, wherein determining a document score for the document using the first scoring model comprises:
   determining that the document does not include the query term; and
   based on determining that the document does not include the query term, demoting a score associated with each occurrence of the restricted-locality synonym in the document.

7. The method of claim 1, wherein determining a document score for the document using the first scoring model comprises:
   determining that the document does not include other synonyms of the query term; and
   based on determining that the document does not include the query term, demoting a score associated with each occurrence of the restricted-locality synonym in the document.

8. The method of claim 1, wherein determining a document score for the document using the first scoring model comprises:
   determining that the restricted-locality synonym does not occur adjacent to a query term; and
   based on determining that the restricted-locality synonym does not occur adjacent to a query term, demoting a score associated with each occurrence of the restricted-locality synonym in the document.

9. The method of claim 1, wherein determining a document score for the document using the first scoring model comprises:
   determining that at least a threshold number of query terms co-occur with the restricted-locality synonym in a sequence of consecutive terms in the document;
   determining that a length of the sequence satisfies a threshold; and
   based on determining that the length of the sequence satisfies a threshold, demoting a score associated with each occurrence of the restricted-locality synonym in the document.

10. A system comprising:
    one or more computers; and
    a computer-readable storage device having stored thereon instructions that, when executed by the one or more computers, cause the one or more computers to perform operations comprising:
    receiving a search query including a query term;
    receiving a document identified as being responsive to the search query;
    receiving an indication that the synonym of the query term in the search query is designated as a restricted-locality synonym;
    in response to receiving the indication that the synonym is designated as a restricted-locality synonym, selecting a first scoring model that specifies how to score occurrences of restricted-locality synonyms in documents, wherein the first scoring model is different than a second scoring model that specifies how to score occurrences of query terms or synonyms that are not designated as a restricted-locality synonym in documents, wherein the first scoring model specifies that a document score for the document depends on whether occurrences of the restricted-locality synonym in the document co-occur in the document with one or more query terms or one or more synonyms of the query term; and
    determining a document score for the document using the first scoring model.

11. The system of claim 10, wherein the first scoring model demotes the document score if an occurrence, of the restricted-locality synonym in the document, is not consistent with an occurrence of the query term in the search query.

12. The system of claim 10, wherein the first scoring model demotes a score associated with occurrences of the restricted-locality synonym in the document.

13. The system of claim 10, wherein the first scoring model defines a demotion of the document score.

14. The system of claim 10, wherein the first scoring model uses one or more criteria for scoring occurrences of restricted-locality synonyms in the document.

15. The system of claim 10, wherein determining a document score for the document using the first scoring model comprises:
    determining that the document does not include the query term; and
    based on determining that the document does not include the query term, demoting a score associated with each occurrence of the restricted-locality synonym in the document.

16. The system of claim 10, wherein determining a document score for the document using the first scoring model comprises:
    determining that the document does not include other synonyms of the query term; and
    based on determining that the document does not include the query term, demoting a score associated with each occurrence of the restricted-locality synonym in the document.

17. The system of claim 10, wherein determining a document score for the document using the first scoring model comprises:
    determining that the restricted-locality synonym does not occur adjacent to a query term; and
    based on determining that the restricted-locality synonym does not occur adjacent to a query term, demoting a score associated with each occurrence of the restricted-locality synonym in the document.

18. The system of claim 10, wherein determining a document score for the document using the first scoring model comprises:
    determining that at least a threshold number of query terms co-occur with the restricted-locality synonym in a sequence of consecutive terms in the document;
    determining that a length of the sequence satisfies a threshold; and
    based on determining that the length of the sequence satisfies a threshold, demoting a score associated with each occurrence of the restricted-locality synonym in the document.

19. A computer program product, encoded on one or more non-transitory computer storage media, comprising instructions that when executed by one or more computers cause the one or more computers to perform operations:
    receiving a search query including a query term;
    receiving a document identified as being responsive to the search query;
    receiving an indication that the synonym of the query term in the search query is designated as a restricted-locality synonym;
    in response to receiving the indication that the synonym is designated as a restricted-locality synonym, selecting a first scoring model that specifies how to score occurrences of restricted-locality synonyms in documents, wherein the first scoring model is different than a second scoring model that specifies how to score occurrences of query terms or synonyms that are not designated as a restricted-locality synonym in documents, wherein the first scoring model specifies that a document score for the document depends on whether occurrences of the restricted-locality synonym in the document co-occur in the document with one or more query terms or one or more synonyms of the query term; and
    determining a document score for the document using the first scoring model.

20. The computer program product of claim 19, wherein the first scoring model demotes the document score if an occurrence, of the restricted-locality synonym in the document, is not consistent with an occurrence of the query term in the search query.

21. The computer program product of claim 19, wherein the first scoring model demotes a score associated with occurrences of the restricted-locality synonym in the document.

22. The computer program product of claim 19, wherein the first scoring model defines a demotion of the document score.

23. The computer program product of claim 19, wherein the first scoring model uses one or more criteria for scoring occurrences of restricted-locality synonyms in the document.

24. The computer program product of claim 19, wherein determining a document score for the document using the first scoring model comprises:
    determining that the document does not include the query term; and
    based on determining that the document does not include the query term, demoting a score associated with each occurrence of the restricted-locality synonym in the document.

25. The computer program product of claim 19, wherein determining a document score for the document using the first scoring model comprises:
    determining that the document does not include other synonyms of the query term; and
    based on determining that the document does not include the query term, demoting a score associated with each occurrence of the restricted-locality synonym in the document.

26. The computer program product of claim 19, wherein determining a document score for the document using the first scoring model comprises:
    determining that the restricted-locality synonym does not occur adjacent to a query term; and
    based on determining that the restricted-locality synonym does not occur adjacent to a query term, demoting a score associated with each occurrence of the restricted-locality synonym in the document.

27. The computer program product of claim 19, wherein determining a document score for the document using the first scoring model comprises:
    determining that at least a threshold number of query terms co-occur with the restricted-locality synonym in a sequence of consecutive terms in the document;
    determining that a length of the sequence satisfies a threshold; and
    based on determining that the length of the sequence satisfies a threshold, demoting a score associated with each occurrence of the restricted-locality synonym in the document.

* * * * *